United States Patent [19]

Augier de Cremiers

[11] 3,909,528

[45] Sept. 30, 1975

[54] DEVICE FOR FINDING A FIXED SYNCHRONIZATION BIT IN A FRAME OF UNKNOWN LENGTH

[75] Inventor: François Augier de Cremiers, Paris, France

[73] Assignee: Compagnie Industrielle des Telecommunications Cit-Alcatel, France

[22] Filed: Apr. 26, 1974

[21] Appl. No.: 464,983

[30] Foreign Application Priority Data

Apr. 27, 1973 France ............................ 73.15442

[52] U.S. Cl. ..... 178/69.5 R; 235/92 FQ; 340/146.2

[51] Int. Cl.² ........................ H04L 7/00; G06F 7/02

[58] Field of Search .................. 178/69.5 R, DIG. 3; 179/15 BS; 235/92 PB, 92 FQ; 340/146.2

[56] References Cited

UNITED STATES PATENTS 3,594,502 7/1971 Clark ............................ 178/69.5 R 3,597,539 8/1971 Clark.............................. 179/15 BS 3,601,537 8/1971 Gueldenpfenning et al... 178/69.5 R

*Primary Examiner*—Charles E. Atkinson

*Assistant Examiner*—Errol A. Krass

*Attorney, Agent, or Firm*—Craig & Antonelli

[57] ABSTRACT

The invention concerns the determining of the length of a repetitive digital train of unknown length, whose synchronization is ensured by a single synchronization bit. That search is effected automatically by a logic circuit which detects the existence of a fixed bit subsequent to a repetitive scanning operation in which the supposed length of the train is increased by one unit each time. To decide whether the result is surely positive, the passing of the train must be repeated a fairly great number of times. To save time, a conclusion of NO is obtained on a smaller number of passes of the train.

10 Claims, 4 Drawing Figures

DEVICE FOR FINDING A FIXED SYNCHRONIZATION BIT IN A FRAME OF UNKNOWN LENGTH

The invention comes within the branch of transmission systems for digital trains. It concerns the determining of the length of a repetitive train having an unknown length, for which synchronization is ensured by a single synchronization bit. That search is effected automatically by a logic circuit which detects the existence of a fixed bit for the adequate values of the parameters used for search. The invention is, to great advantage, used in a receiving station able to receive a signal in the form of a train having a single synchronization bit, whose structure is not known previously.

The correct decoding of a repetitive digital train having a synchronization bit reaching a receiving station requires the identification of the number N of bits constituting the train and the detection of the synchronization bit. An example of such a digital train is given by a multiplexed delta modulation frame having N −1 channels in time, with a single synchronization bit.

The principle of the search is based on the comparison of two bits in the incident train, separated by $n$ clock instants. If the coincidence between these two bits is observed on a predetermined number of trains $p$ (assuming contingently that there are certain gaps if the synchronization bits does not appear in all the frames), it is assumed that N (number of bits in the frame) is equal to $n$ (number of bits taken as a basis for the analysis) and that moreover, the sampling of the compared bits is suitably timed. If the result of the comparison is negative, successive shifts in the timing of the analysis clock are carried out until the result of the comparison is positive. If no positive result is obtained after $n$ shifts, this proves that N is different from $n$. The analysis is started all over again with $n + 1$, etc., until a positive result is obtained.

Correct timing is revealed by a probability of coincidence $P \cong 1$. But as the synchronization bit is single, in the case of incorrect timing, the probability of a positive result of the comparison test is $P' \cong ½$: the difference between P and P′ is therefore relatively slight. To improve the reliability of the test without lengthening it considerably, two tests in parallel are used, the one having a long cycle (observation of $p$ frames), the other having a short cycle (observation of $q$ frames, $q < p$). The results of these two tests being weighted differently, a "NO" conclusion may be obtained relatively rapidly and leads to a change in analysis parameters, whereas a "YES" conclusion is given finally after a test which lasts longer, which is effected not very many times during the search.

Accordingly, an object of the present invention is to provide a device for analyzing a frame of rhythmic binary signals having a repetitive fixed bit comprising a comparator, effecting permanently on a frame received, the comparison of two bits separated by $n$ clock instants (rhythm known as a clock pulse H frame), a divider having a variable order timed with respect to $n$ receiving a binary rhythm, a shift element placed before the said divider having a variable order, a counter which displays a value reproduced on the divider having a variable order, a counting means having an order $n$ for making the said counter advance by one unit after $n$ shifts, characterized in that it contains a logic processing circuit having a first flip-flop whose output is set to 1 each time a first counting element has counted the passing of $p$ frames and is reset to zero when a second counting element has counted $j$ coincidences observed by the said comparator during the passing of a frame and a second flip-flop whose output is set to 1 at the beginning of a frame analysis and is reset to zerò at the same time as the output of the said first flip-flop.

The invention will be set forth in detail reference to two examples of embodiments illustrated in the following FIGURES.

Figure 1:
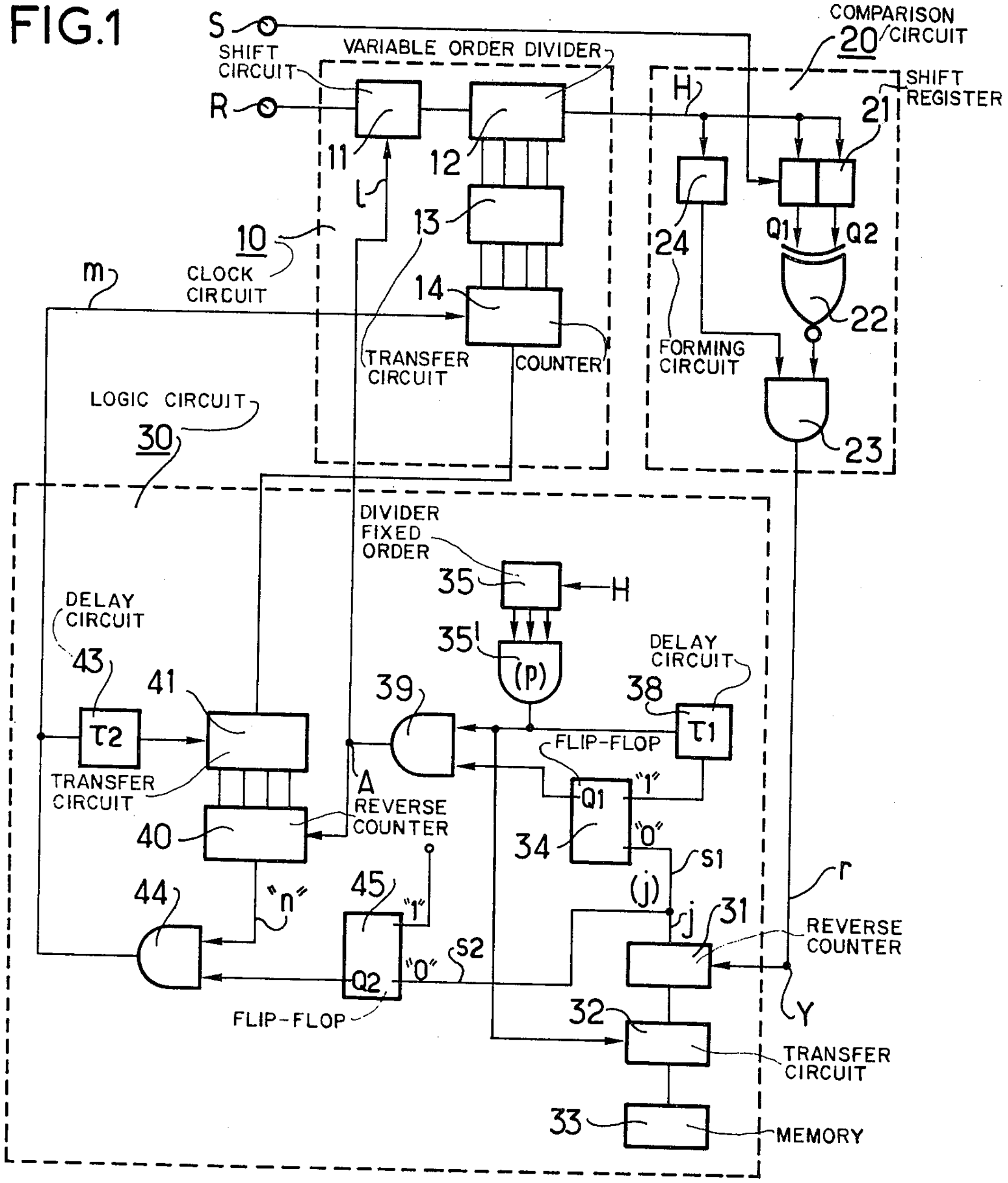
FIG. 1 is a diagram of an embodiment in the case of general operation.

With respect to FIG. 1, the complete device comprises a clock circuit 10, a comparator circuit 20, and a logic processing circuit 30. Each of these circuits are described as follows:

Clock circuit 10: The binary rhythm transmitted with the frame to be analyzed reaches a terminal R. The binary rhythm crosses a circuit 11 which makes it possible to effect shifts in the binary rhythm, that is, to cancel a pulse of the binary rhythm each time a control pulse reaches the element 11 through a line L. Such shift elements are well known in the art.

The element 12 in series with 11 is a divider having a variable order, in which the divider $n$ is displayed by a parallel transfer circuit 13 for the indications of a counter 14. The counter 14 is adjusted in the first instance at $n_o$ and advances by one unit each time it receives a counting pulse through a line $m$. A parallel transfer circuit 41 ensures the displaying of the number $n$ on a reverse counting counter 40 contained in the logic processing circuit 30. A clock pulse H which is used in the comparator 20 and in the logic processing circuit 30 leaves the variable order divider 12.

Comparator circuit 20: A shift register having two flip-flops, 21, receives a binary signal coming from an input terminal S. The advance of that register is ensured by the clock signal H leaving the variable order divider 12. The outputs of the two flip-flops Q1, Q2, of the register 21 are connected to an $\overline{\text{EXCLUSIVE OR}}$ circuit 22. An AND gate 23 receives the output of the circuit 22 as well as a reading order leaving a forming circuit 24 energized by the clock signal H. The output of the gate 23 is connected by a line $r$ to the input of a reverse counting counter 31 forming a part of the logic processing circuit 30.

Logic processing circuit 30: A reverse counting counter 31 receives an order through the line $r$. It may receive the displaying of a fixed value $j$ contained in a memory 33 through a transfer circuit 32.

The passing through zero of the reverse counting counter 31 sends out an order for resetting to zero to a first bistable flip-flop 34 through a line $s1$. The bistable flip-flop 34 receives an order for resetting to 1 through a pulse coming from the output of a divider having a fixed order 35, comprising a decoder 35′, which receives the clock pulses H.

The output pulse of the divider by $p$, 35 + 35′, is applied to a terminal for resetting to 1 ("1") of the bistable flip-flop 34 through a delay circuit 38, having a delay value of $\tau 1$.

The output of the divider by $p$, 35 + 35′, is also connected to the transfer circuit 32, as well as to an input of an AND gate 39, another of whose inputs is connected to the output Q1 of the bistable flip-flop 34.

The output A of the AND gate 39 energizes, through the line L, the shift circuit 11.

It is also applied to a reverse counting counter 40, which is set at $n$, a value received from the counter 14 through the transfer circuit 41. The transfer circuit 41 is energized through a delay circuit 43 (delay $\tau 2$) by a pulse flowing through the line $m$.

That pulse flowing through the line $m$ comes from the passing to zero of the reverse counting counter 40, on condition that it is allowed by an AND gate 44 which has a first input connected up to the output of the said reverse counting counter 40 and a second input connected to an output Q2 of a second bistable flip-flop 45, which has an input for resetting to zero ("0") connected to the output of the reverse counting counter 31 (line $s2$) and an input for resetting to 1 ("1") which is energized by a beginning of analysis order.

Operation: During the analysis of a frame, several situations normally occur in succession.

1. When $p$ frames have been counted by the divider 35 + 35′, on a basis of $n$ bits per frame (value $n$ set originally on the counter 14), the reverse counting counter 31 has not seen $j$ coincidences ($j < p$) coming from Y, but a lower number, pass. The flip-flop 34, which is at 1, allows a pulse "$p$" to pass through towards the shift circuit 11 (line 1). At the same time, the pulse "$p$" leaving 35′ makes the reverse counting counter 40 reverse by one unit and re-positions the reverse counting counter 31 to the value $j$ by means of the transfer element 32.

The analysis continues on the same basis $n$, but with a shift by one unit.

2. The new analysis thereof again gives a negative result. The same process begins again with a new shift by one unit. When $n$ successive analyses have been made with a negative result, this is the proof that the parameter $n$, which is the basis of the analysis, is not equal to the number N of bits of the unknown frame.

The reverse counting counter 40 then gives an output pulse designated as pulse "$n$," which, crossing through the gate 44, which is open (the flip-flop 46 has been set to 1 at the beginning of the analysis, by the starting up order), reaching the counter 14 through the line $m$ makes the counter advance by one unit. When the counter 14 has displayed the new value $n + 1$, the same pulse "$n$," delayed by $\tau 2$ by the circuit 43, effects the transfer of the new value $n + 1$, in the reverse counting counter 40, by the element 41.

3. For a certain value of $n$, with a certain shift, $j$ coincidences (or more) are observed during the passing of $p$ frames. This is the indication that the value of $n$ is equal to N. The flip-flop 34 is reset to zero by the output of the reverse counting counter 31 and prohibits the passing of an order for a shift towards 11. The flip-flop 45 is set to zero and prohibits any further modification of $n$: the analysis is ended.

Figure 2:
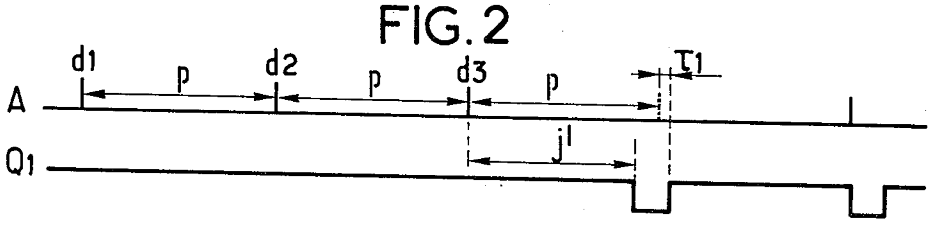
FIG. 2 is a graph making it easier to understand the operation of the device according to FIG. 1.

FIG. 2 — FIG. 2 provides a complement of analysis of the operation. It comprises two graphs, the one having the situation at the point A (FIG. 1), the other having the logic states of the output Q1 of the flip-flop 34 during an analysis.

A pulse "$p$" reaching the point A constitutes a shifting order $d$ for the element 11, as long as the output Q1 is at 1. For a certain shift, $j$ coincidences pass on a number of frames designated by $j'$, which is less than $p$, but which may be greater than $j$; for the synchronization bit may be missing in certain frames.

When $j$ coincidences have passed at the instant $j' < p$, Q1 is set to zero. The result of this is that the pulse "$p$" which is subsequently generated does not cause any shift (it is marked with a dotted line on the graph A). Nevertheless, reaching the input "1" of the flip-flop 34 at the end of the delay $\tau 1$, it resets the flip-flop to 1.

It is assumed that after the third shift $d3$, the synchronization is established.

On the one hand, the flip-flop 45 has been reset to zero by a pulse "$j$" and remains there permanently, until a further analysis order is sent out: it has been found that $n = N$ and this prohibits interference with $n$. On the other hand, the flip-flop 34 is reset to 1 at each passing of $p$ frames, this enabling the test to be checked after every $p$ frames. In the case of momentary error, the further timing with respect to the synchronization bit will be effected automatically.

Figure 3:
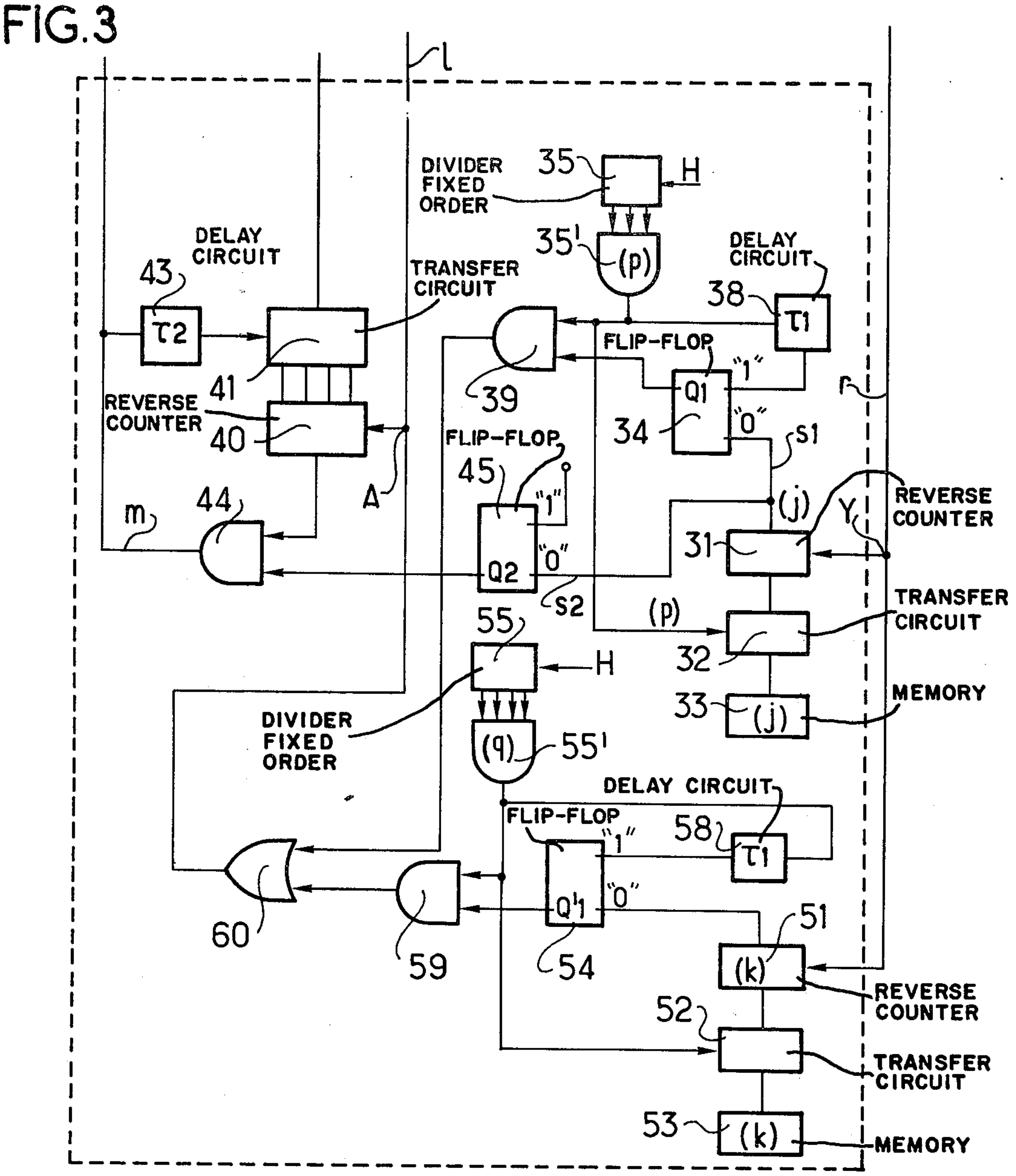
FIG. 3 shows an additional diagram corresponding to the two simultaneous tests referred to above.

FIG. 3 — As has been set forth hereinabove, the distinction between a positive analysis result and a negative result corresponds to a relatively slight difference in probability. Moreover, to arrive finally at a positive result, a relatively high number $j$ of coincidences with an even higher number $p$ of passes of frames is required. For example, it will be assumed that $p = 30$, $j = 26$. The result of this is that a complete analysis is liable to be long.

Nevertheless, if it is indispensable to observe a great number of coincidences to conclude "YES," if a negative result has already been obtained for a number $k$ of coincidences less than $j$ ($k < j$), during the passing of $q$ frames, where $q < p$, it is useless to wait further to conclude "NO" and to give a shift order. For example, it will be assumed that $q = 10$, $k = 7$. Considerable time will therefore be saved on the duration of a complete analysis.

FIG. 3 gives a diagram of the device completed by a short-cycle logic circuit.

The references 31 to 40, 44, 45, have the same significance as in FIG. 1.

In parallel with the logic circuit "$j - p$", there is a logic circuit "$k - q$" having a decision which lasts much shorter, comprising a reverse-counting counter 51, which may receive the parameter $k$ contained in 53 by a transfer circuit 52. 55 is a divider by $q$, connected with a decoder 55′, which sends out a pulse, on the one hand towards an AND gate 59 and transfer circuit 52, on the other hand with a delay $\tau 1$ given by an element 58, towards a terminal for resetting to 1 of a bistable flip-flop 54, having an output Q′1 which may be reset to zero by the output of 51. The point Y is connected up to the input of 31 and to the input of 51. The outputs of 39 and 59 are connected together by an OR circuit 60, whose output is connected up to the input of the reverse counting counter 40.

Figure 4:
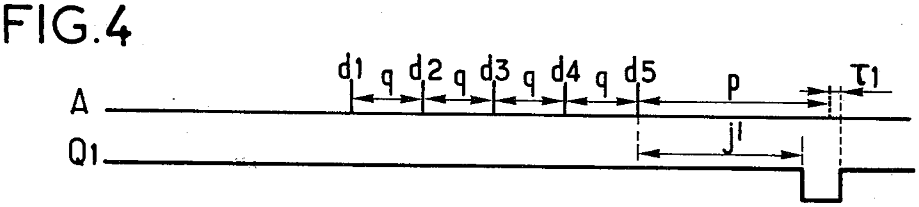
FIG. 4 is a graph making it easier to understand the operation of the device in FIG. 3.

FIG. 4 shows data similar to that in FIG. 2, referring to point A (FIG. 2) and the output Q′1 of the flip-flop 54.

It is supposed that after five shifts (short cycle) the required number of coincidences $j$ is obtained after the lapse of time $j'$ (long cycle). The confirming of the synchronization is given with all required security by the long-cycle test. The failure of the short-cycle test ($k -$ $q$) causes shifts and changes of $n$. The success of a long-cycle test ($j - p$) blocks the value of $n$.

While I have shown and described only one embodiment in accordance with the present invention, it is understood that the same is not limited thereto but is susceptible of numerous changes and modifications as known to those skilled in the art and I therefore do not wish to be limited to the details shown and described herein but intend to cover all such changes and modifications as are encompassed by the scope of the appended claims:

What I claim is:

1. A device for determining the length of a repetitive digital train of unknown length having a fixed synchronization bit, said device comprising comparison means receiving incident repetitive digital trains of unknown length for comparing two bits in an incident train, said bits being separated by $n$ clock instants, clock circuit means for generating clock pulses, logic circuit means coupled to said comparison means and said clock circuit means for sampling the coincidence of said two bits on a predetermined number of said trains, said logic circuit means including first means for effecting successive shifts of the timing of said clock circuit means upon the failure to detect coincidence on said predetermined number of trains until coincidence is effected, and second means for restarting the sampling by said logic circuit means for two bits separated by $n + 1$ clock instants upon failure to detect coincidence after $n$ shifts effected by said first means.

2. A device according to claim 1, wherein said clock circuit means includes a divider means of variable order timed with respect to $n$ for effecting said clock pulses in accordance with a binary rhythm transmitted with said train, shift element means coupled with said first means for effecting shifts in said binary rhythm, and first counter means coupled to said second means for displaying a value reproduced on said divider means of variable order, wherein said first means includes a first counting element receiving said clock pulses for counting the occurrence of said predetermined number of trains, a second counting element connected to said comparison means for counting the number of coincidences, and a first flip-flop having an output set to 1 each time said first counting element has counted said predetermined number $p$ and reset to zero when said second counting element has counted a predetermined number $j$ of coincidences, and wherein said second means includes second counter means having an order $n$ for advancing said first counter means by one unit after $n$ shifts.

3. A device according to claim 2, wherein said first counting element is a divider by $p$ receiving a clock pulse H, said first counting element having output pulses applied both to an input of a first AND gate and to a transfer element connected with said second counting element, said output pulses being applied with a delay also to a terminal for resetting to 1 said first flip-flop, said first AND gate further having an input connected to the output of said flip-flop, and said first AND gate having an output applied both to said second counter means and to said shift element means.

4. A device according to claim 3, wherein said second counting element has an input provided from the output of said comparison means, and said second counting element can display value $j$ through said transfer element, said second counting element further having an output connected to a terminal for resetting said first flip-flop to zero.

5. A device according to claim 4, wherein a second AND gate receives through one input the output of said second counter means and through another input, the output of a second flip-flop, said second flip-flop having an output set to 1 at the beginning of a determination of said train length and reset to zero at the same time as the output of said first flip-flop.

6. A device according to claim 5, wherein the output of said comparison means is further connected to an input of a third counting element which can receive a parameter $k$ through a second transfer element, said third counting element having an output connected to an input for resetting to zero a third flip-flop.

7. A device according to claim 6, wherein a divider by $q$ which receives said clock pulse H, is provided for having an output connected to said second transfer element to a third AND gate, and to a terminal for resetting to 1 said third flip-flop by means of a delay element, said third AND gate also receiving an output of said third flip-flop.

8. A device according to claim 7, wherein an OR circuit is provided for receiving the output of each of said first and third AND gates, said OR circuit having an output applied to said second counter means, and to said shift element means.

9. A device according to claim 2, wherein said second counting element includes a first reverse counting counter for resetting said first flip-flop to zero upon passing through zero by said first reverse counting counter, and wherein said second counter means includes a second reverse counting counter for advancing said first counter means upon passing through zero of said second reverse counting counter.

10. A device according to claim 4, wherein said digital train is a multiplexed delta modulation frame having N − 1 channels in time and a single synchronization bit.

* * * * *